United States Patent
Atzitz et al.

(10) Patent No.: US 10,067,861 B2
(45) Date of Patent: Sep. 4, 2018

(54) EFFICIENT SOFTWARE TESTING

(71) Applicant: International Business Machines Corporation, Armonk, NY (US)

(72) Inventors: Shay Atzitz, Rishon Le-Zion (IL); Shy Matza, Nes-Ziona (IL); Yacoby Shachar, Rehovot (IL); Omer Shadmi, Neve Mivtah (IL); Raz M. Yerushalmi, Kfar Varburg (IL)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 15/047,914

(22) Filed: Feb. 19, 2016

(65) Prior Publication Data
US 2017/0242781 A1  Aug. 24, 2017

(51) Int. Cl.
G06F 9/44 (2018.01)
G06F 11/36 (2006.01)
G06F 8/70 (2018.01)

(52) U.S. Cl.
CPC ............ G06F 11/3688 (2013.01); G06F 8/70 (2013.01); G06F 11/3676 (2013.01)

(58) Field of Classification Search
None
See application file for complete search history.

(56) References Cited

U.S. PATENT DOCUMENTS

| | | | |
|---|---|---|---|
| 6,944,848 B2* | 9/2005 | Hartman | G06F 8/30 714/E11.208 |
| 7,478,075 B2 | 1/2009 | Urmanov et al. | |
| 7,865,339 B2 | 1/2011 | Rushby et al. | |
| 8,276,123 B1* | 9/2012 | Deng | G06F 11/3688 714/37 |
| 8,326,848 B2 | 12/2012 | Dettinger et al. | |
| 8,615,385 B1 | 12/2013 | Aldrich | |
| 8,868,977 B2* | 10/2014 | Birnbaum | G06F 11/3608 703/21 |
| 9,442,830 B1* | 9/2016 | Zhang | G06F 11/3688 |
| 2005/0144529 A1* | 6/2005 | Gotz | G06F 11/3684 714/38.1 |
| 2005/0223295 A1* | 10/2005 | Hermes | G06F 11/3684 714/38.1 |
| 2005/0246207 A1* | 11/2005 | Noonan | G06F 11/3409 705/4 |

(Continued)

*Primary Examiner* — Matthew J Brophy
(74) *Attorney, Agent, or Firm* — Stephen R. Yoder

(57) ABSTRACT

A method includes receiving, via a processor, a model, a test case, and one or more suspect elements. The method includes calculating, via the processor, a relevance score for each model element of the model based on the one or more suspect elements. The method includes setting, via the processor, a threshold reduction score. The method includes generating, via the processor, a reduced model by reducing the model based on the relevance scores and the threshold reduction score. The method includes evaluating, via the processor, the reduced model based on the test case. The method includes detecting, via the processor, the reduced model reproduces an expected behavior. The method includes outputting, via the processor, a result model in response to detecting the reduced model reproduces the expected behavior. The method includes modifying, via the processor, an application associated with the model based on the reduced model.

20 Claims, 11 Drawing Sheets

(56) References Cited

U.S. PATENT DOCUMENTS

| | | | |
|---|---|---|---|
| 2006/0161404 A1* | 7/2006 | Campbell | G06F 11/3688 703/2 |
| 2009/0094575 A1* | 4/2009 | Vieira | G06F 8/10 717/104 |
| 2009/0254887 A1* | 10/2009 | Rossi | G06F 11/3688 717/126 |
| 2009/0307649 A1 | 12/2009 | Pramanik et al. | |
| 2011/0246409 A1 | 10/2011 | Mitra | |
| 2012/0030651 A1* | 2/2012 | Kemmler | G06F 11/3688 717/124 |
| 2012/0324286 A1* | 12/2012 | Birnbaum | G06F 11/3608 714/26 |
| 2012/0324414 A1* | 12/2012 | Tzoref-Brill | G01R 31/31835 716/136 |
| 2013/0086556 A1* | 4/2013 | Grechanik | G06F 11/3684 717/126 |
| 2013/0151906 A1* | 6/2013 | D'Alterio | G06F 11/3692 714/38.1 |
| 2013/0287306 A1* | 10/2013 | Galvin, Jr. | G06F 17/30699 382/218 |
| 2013/0326472 A1 | 12/2013 | Han et al. | |
| 2014/0137057 A1* | 5/2014 | Tzoref-Brill | G06F 11/3676 716/107 |
| 2014/0245267 A1* | 8/2014 | Wang | G06F 11/3672 717/124 |
| 2015/0007138 A1* | 1/2015 | Sabetta | G06F 11/3684 717/124 |
| 2015/0161386 A1 | 6/2015 | Gupta et al. | |
| 2016/0019135 A1* | 1/2016 | Gotlieb | G06F 11/3684 717/124 |
| 2016/0259713 A1* | 9/2016 | Belur | G06F 11/3676 |
| 2017/0060734 A1* | 3/2017 | Raz | G06F 11/3684 |
| 2017/0075794 A1* | 3/2017 | Rannakrishna | G06F 11/3676 |
| 2017/0123963 A1* | 5/2017 | Koren | G06F 11/3688 |
| 2017/0139819 A1* | 5/2017 | D'Andrea | G06F 11/3688 |

* cited by examiner

EFFICIENT SOFTWARE TESTING

BACKGROUND

The present disclosure relates generally to the field of computer software engineering, and more particularly to software testing.

Software testing refers to the execution of a software component or system component to evaluate one or more properties of interest with the intent of finding software bugs (errors or other defects). Such testing can provide information about the quality of the software component or system component.

A testing model includes a set of model elements, diagrams, relations, and so on. A testing model can be used for many purposes, one of which could be to generate code out of the model. The code generated out of the model may be compiled. Another purpose of the model could be to generate documentation, which could have an erroneous paragraph somewhere.

SUMMARY

According to an embodiment described herein, a system can include a processor to receive a model, a test case, and one or more suspect elements. The processor can calculate a relevance score for a plurality of model elements of the model based on the suspect elements. The processor can set a threshold reduction score. The processor can generate a reduced model by reducing a number of the plurality of model elements in the model based on the relevance scores and the threshold reduction score. The processor can evaluate the reduced model based on the test case. The processor can determine whether the reduced model reproduces an expected behavior. The processor can further output a result model in response to detecting that the reduced model reproduces the expected behavior. The processor can modify an application associated with the model based on the reduced model.

According to another embodiment described herein, a computer-implemented method includes receiving, via a processor, a model, a test case, and one or more suspect elements. The computer-implemented method includes calculating, via the processor, a relevance score for each model element of the model based on the suspect elements. The computer-implemented method includes setting, via the processor, a threshold reduction score. The computer-implemented method includes generating, via the processor, a reduced model by reducing the model based on the relevance score and the threshold reduction score. The computer-implemented method includes evaluating, via the processor, the reduced model based on the test case. The computer-implemented method includes detecting, via the processor, the reduced model reproduces an expected behavior. The computer-implemented method includes outputting, via the processor, a result model in response to detecting that the reduced model reproduces the expected behavior. And the computer-implemented method includes modifying, via the processor, an application associated with the model based on the reduced model.

According to another embodiment described herein, a computer program product for test model reduction can include computer-readable storage medium having program instructions embodied therewith. The computer readable storage medium is not a transitory signal per se. The program instructions executable by a processor to cause the processor to receive a model, a test case, and one or more suspect elements. The program instructions can cause the processor to calculate a relevance score for each model element of the model based on the suspect elements. The program instructions can cause the processor to set a threshold reduction score. The program instructions can cause the processor to generate a reduced model by reducing the model based on the relevance scores and the threshold reduction score. The program instructions can cause the processor to evaluate the reduced model based on the test case. The program instructions can cause the processor to determine whether the reduced model reproduces an expected behavior. The program instructions can cause the processor to output a result model in response to detecting the reduced model reproduces the expected behavior. The program instructions can cause the processor to modify an application associated with the model based on the reduced model.

DETAILED DESCRIPTION

Figure 1:
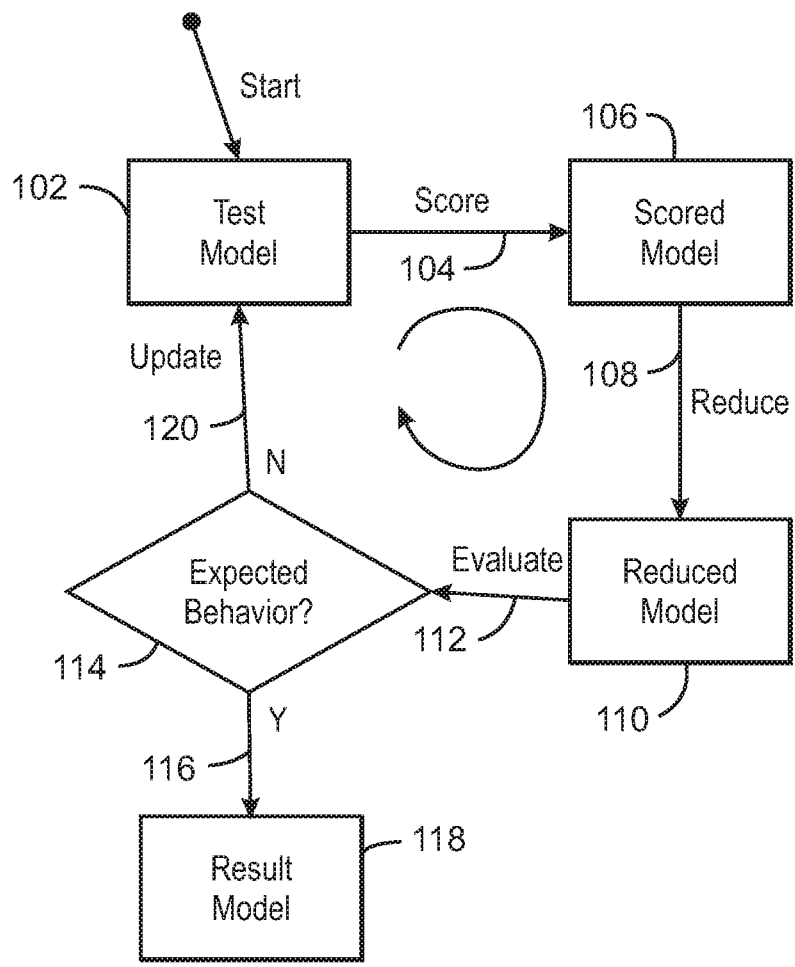
FIG. 1 is a block diagram of an example process for reducing test models, in accordance with embodiments of the present invention.

Model-based testing is an application of model-based design for designing and optionally also executing artifacts to perform software testing or system testing. Models can be used to represent the desired behavior of an application or a System Under Test (SUT), or to represent testing strategies and a test environment. However, test cases that are reported using very large models may be difficult to debug and further take a long time to execute, in addition to containing a significant amount of redundant model information that may be harder to share with external Independent Software Vendors (ISVs) due to size and confidentiality, among other reasons.

According to some embodiments of the present invention, a test model can be reduced by removing model elements from the model with relevance scores greater than a threshold reduction score. For example, the relevance score for each model element can be calculated based on the relation of each model element to a suspect element. The resulting reduced model can then be tested on the test case and output if it reproduces an expected behavior. For example, the expected behavior may be a crash or an error, among other events. Thus, the embodiments of the present disclosure enable time and resources to be saved by not having to manually reduce models. Furthermore, the embodiments may produce a plurality of reduced models to use for testing. The reduced models may use less storage and thus increase testing efficiency. The reduced models may also enable faster debugging and fixing of technical problems, in addition to shorter test execution times that may save resources. The reduced models can provide the same coverage as full models, but with a smaller number of tests. Thus, the reduced models may also use less server storage and use less network traffic.

Some embodiments of the present invention may be implemented in a cloud computing environment. As discussed in more detail below in reference to at least FIGS. 8-10, a computing device configured to reduce the size of test models may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

With reference now to FIG. 1, FIG. 1 is a block diagram of an example process 100 for reducing test models, in accordance with embodiments of the present invention. The example process 100 can be implemented using the computing device 800 of FIG. 8 below. FIG. 1 includes a test model 102. The example process 100 includes generating a scored model 106 by scoring the test model 102 as indicated by an arrow 104. The example process 100 includes generating a reduced model 110 by reducing the scored model 106 as indicated by an arrow 108. The example process 100 also includes evaluating the reduced model 110 as indicated by an arrow 112 and determining 114 whether an expected behavior is reproduced. The example process includes outputting a result model 118 based on a detected reproduction of the expected behavior as indicated by an arrow 116. The example process 100 also can include updating the test model as indicated by an arrow 120.

In the example of FIG. 1, the example process 100 can include receiving the test model 102 to reduce. The example process 100 receives a test case, a list of suspect elements, and an indication of a failed test case. A test case, as used herein, refers to one or more actions that are performed on a test model to receive an expected indication of a failure. For example, an example test case can include the actions "select a specific element" and "perform right click." The suspect element can be any model element suspected of causing an expected behavior. For example, the suspect element can be a specific instance, a metatype name, or model constraint, among other possible suspect elements. In some examples, the suspect element can be an Object Constraint Language (OCL) expression. The indication, or expected behavior, can be an exception, a compilation error in some log, a return error code, or any other form of indication from a failed test. For example, the expected behavior can include an uncaught exception, a compilation error in generated code, some return code, or a code snippet that is being generated out of a model, among others. As indicated by arrow 104, the example process 100 can include scoring individual elements of the test model 102. For example, each model element can be assigned a relevance score based on a relation between the model element and a suspect element from the list of suspect elements. In some examples, the relevance score can be recalculated during reduction iterations.

Still referring to FIG. 1, for each suspect element, the example process 100 can include reducing the scored model 106 to generate the reduced model 110 as indicated by the arrow 108. In some examples, the example process 100 can include maintaining model correctness for a specific domain while reducing the scored model 106. For example, a model element may have a minimal multiplicity constraint. For example, an element X may aggregate at least n instances of element Y. In this case, the reduction may not remove the nth element from X, thus leaving n−1 Y elements. The example process 100 may include evaluating the reduced model 110 as indicated by the arrow 112. For example, the example process 100 can include evaluating the reduced model 110 by executing the test case on the reduced model 110.

In some examples, if the test case returns an expected behavior as indicated by arrow 116, then the example process 100 can include returning the result model 118. The result model 118 can include all the elements of the successfully reduced model. A successfully reduced model, as used herein, refers to a reduced model that, when evaluated using the test case, reproduces the expected behavior. The result model 118 can then be used to modify an application associated with the model or a System Under Test (SUT). In some examples, a list of model elements that were removed by the example process 100 to generate the result model 118 can also be returned. For example, the removed elements can be used for debugging, as they are the last set of elements that were removed and caused the test to fail. In some examples, the removed elements may be the elements involved in the root cause of the test failure.

In some examples, if determining 114 does not result in a detected expected behavior, then the relevance scores can be updated as indicated by an arrow 120. The example process 100 can also determine removed model elements that prevented the expected behavior from occurring. The example process 100 can include increasing the relevance score of the removed model elements and updating the relevance scores. The example process 100 can then score the test model 102 based on the updated relevance scores as described in greater detail with respect to FIG. 2 below. In some examples, a threshold reduction score can also be updated, as also discussed in greater length with respect to FIG. 2 below. For example, the threshold reduction score can be raised or lowered based on the results of the determining 114.

It is to be understood that process 100 need not include all of the components shown in FIG. 1. Rather, the process 100 can include fewer or additional components not illustrated in FIG. 1 (e.g., additional models, evaluations, etc.).

Figure 2:
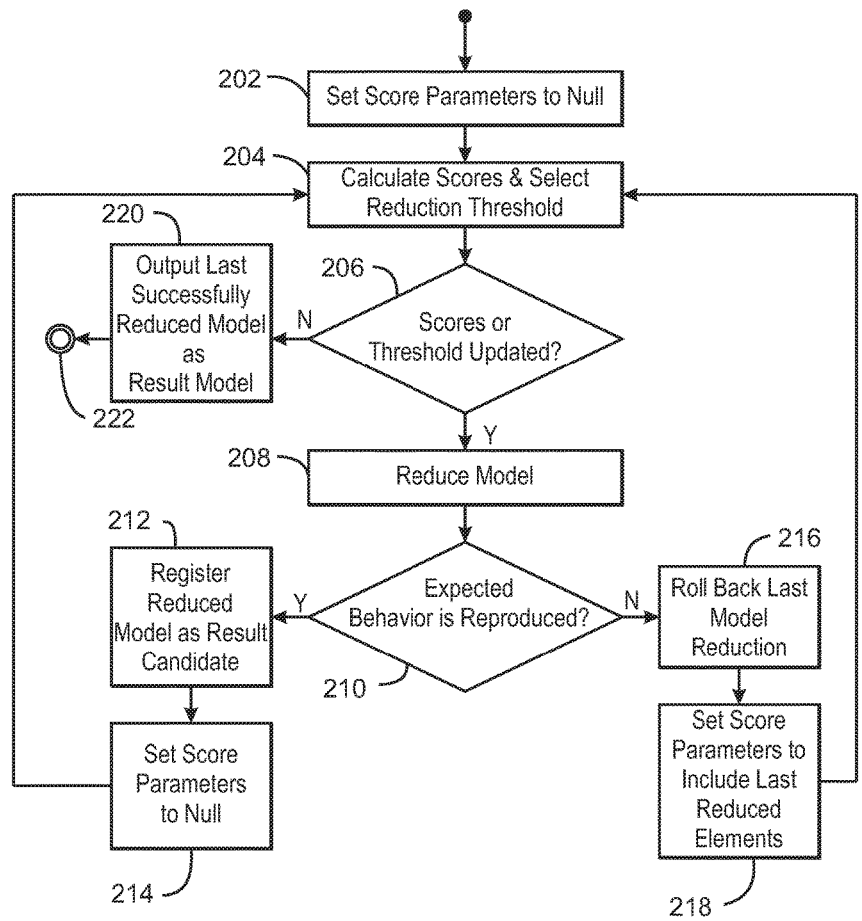
FIG. 2 is a process flow diagram of an example method for scoring model elements to reduce test models, in accordance with embodiments of the present invention.

FIG. 2 is a process flow diagram of an example method for scoring model elements to reduce test models, in accordance with embodiments of the present invention. The method 200 can be implemented with any suitable computing device, such as the computing device 800 of FIG. 8.

At block 202, the computing device can reset score parameters for a plurality of model elements. For example, the computing device can set the score for each model element to a default value. For example, the default value can be any value, such as a null value. The computing device can also receive a test case, a list of suspect elements, and/or a list of rolled-back elements.

At block 204, the computing device can calculate relevance scores for the model elements and select a threshold reduction score. For example, the threshold reduction score includes a value that, if exceeded, may result in a model element being removed. The computing device can calculate relevance scores based on the relation of each model element to a provided suspect element. For example, the model elements can be represented as nodes in a graph. The computing device can calculate a relevance score for each node and edge in the graph. In some embodiments, the computing device can calculate relevance scores based on graph-distance. In some examples, the computing device can use connectivity components to calculate a relevance score. For example, the computing device may generate higher relevance score for model elements that are directly or indirectly connected to suspect elements. In some examples, the graph may be weighted. The computing device may weight different kinds of relations among model elements differently. For example, the computing device may give composition of the graph a higher weight than aggregation. In some examples, the computing device can calculate scores as described in detail with respect to FIG. 4 below.

At block 206, the computing device can determine whether any of the relevance scores or the threshold reduction scores were updated at block 204. For example, one or more values of the relevance scores or the threshold reduction score may have been replaced with a different value. If any of the relevance scores or the threshold reduction score were updated, then the method 200 may continue at block 208. If the computing device detects that none of the relevance scores, nor the threshold reduction score, were updated, then the process may continue at block 220.

At block 208, the computing device reduces the model. The computing device can reduce model based on the relevance scores of the model elements and the threshold reduction score. In some examples, the relevance scores and threshold reduction score may be updated relevance scores and/or an updated threshold reduction score. In any case, the computing device may include model elements that have a relevance score that exceeds the threshold reduction score. In some examples, if the relevance scores and/or the threshold reduction score are updated, then the computing device can also compare the model to be reduced with previously reduced states of the model and select an appropriate reduced model to further reduce based on the updated relevance scores and/or threshold reduction score. For example, if an updated threshold reduction score was raised, then the computing device can use the previous reduced model and remove model elements having relevance score that do not exceed the raised threshold reduction score. In some examples, the computing device can compare the model with previously reduced models and choose a previously reduced model that is similar to the model. Thus, time and resources may be saved by starting from the previous reduced model.

At block 210, the computing device may determine whether an expected behavior is reproduced. For example, the computing device may perform an evaluation of the reduced model generated from block 208 using the test case received in block 202. The computing device can execute the test case on the reduced model and determine whether the expected behavior is reproduced. For example, the expected behavior can be an error. If the computing device detects the expected behavior, then the process may continue at block 212. If the computing device does not detect the expected behavior, then the process may continue at block 216.

At block 212, the computing device can register the resulting reduced model as a result candidate. For example, the computing device may add the reduced model to a list of result candidates that may be used for testing. In some examples, the computing device can choose a result model from a plurality of result candidates based on the size of the result candidates. For example, the computing device can determine the smallest result candidate and output the smallest result candidate as a result model.

At block 214, the computing device sets the score parameters for each of the model elements to a default value. For example, the default value can be a NULL value.

At block 216, the computing device can roll back the last model reduction in response to detecting that the expected behavior was not reproduced. For example, a test case may have not reproduced the expected behavior, such as an error.

At block 218, the computing device may return a list of last removed elements after rolling the last removed element back. In some examples, the computing device may then perform a rollback refinement depending on the number of elements that were removed as described in detail with respect to FIGS. 5-7 below. The computing device can then recalculate the scores for each model element and select a reduction threshold score as in block 204 above.

At block 220, the computing device can output the last successfully reduced model as a result model. For example, the result model can include all the model elements of the last successfully reduced model. The last successfully reduced model refers to the last reduced model that reproduced the expected behavior when evaluated. For example, the last successfully reduced model may have been generated prior to one or more reduced models that did not reproduce the expected behavior.

At block 222, the computing device can modify an application associated with the model based on the result model. For example, one or more specific instances, metatype names, model constraints, or Object Constraint Language (OCL) expressions may be modified. For example, the computing device can use the result model to test the application under various conditions and modify the application according to the results. For example, the computing device can modify an application so that the expected result or error is no longer produced when executing the reduced model. Furthermore, in some embodiments, the computing device can modify a circuit design so that the circuit no longer produces the expected behavior or error when executing the reduced model. In some embodiments, a modification program of the computing device can autonomously modify the application or a design of a circuit. As discussed above, the reduced model includes fewer instructions, which can reduce the amount of time and reduce the number of attempts the modification program uses to modify an application or circuit design being tested.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
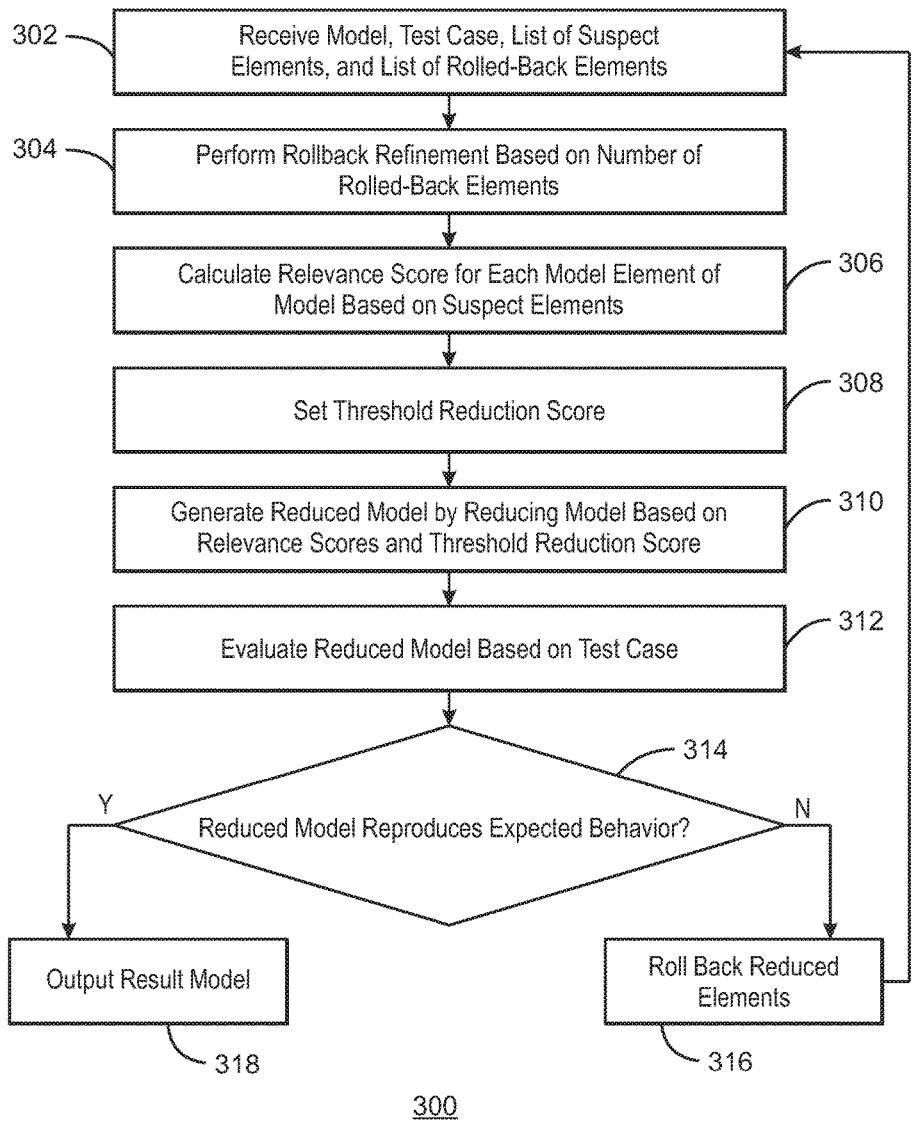
FIG. 3 is a process flow diagram of an example method for generating reduced models for testing, in accordance with embodiments of the present invention.

FIG. 3 is a process flow diagram of an example method for generating reduced models for testing, in accordance with embodiments of the present invention. The method 300 can be implemented with any suitable computing device, such as the computing device 800 of FIG. 8.

At block 302, the computing device receives a model, a test case, a list of suspect elements, and a list of rolled-back elements. For example, the suspect elements can include meta-types, model constraints, OCL expressions, among other possible model elements that are suspected of causing the expected behavior or being related to the expected behavior. The rolled-back elements can include any elements that were rolled-back from a previous iteration of method 300. For example, the reduced model from the previous iteration of the method 300 may not have produced an expected behavior during evaluation on the test case and therefore may have been rolled back to the previous model.

At block 304, the computing device performs a rollback refinement based on a number of rolled-back elements. For example, the rolled-back elements can include any elements which, in response to being removed from the model, can cause the expected behavior to be irreproducible. The rollback refinement can be performed according to any of methods 500-700 as discussed with respect to FIGS. 5-7 below.

At block 306, the computing device calculates a relevance score for each model element of the model based on the list of suspect elements. In some examples, the computing device can score the elements using a graph. For example, for Unified Modeling Language (UML) or Eclipse Modeling Framework (EMF) models, the computing device can calculate the relevance score using graph connectivity. Each model element can be a node, and each relation among model elements can be edges in the graph. For example, relations can include container and contained, typed-by and type-of, dependent and depends-on. In some examples, the computing device can calculate the relevance score according to a method 400 discussed in more detail with reference to FIG. 4 below.

At block 308, the computing device sets a threshold reduction score. For example, the threshold reduction score is the score by which the computing device can remove elements with scores exceeding the threshold from the model. In some examples, the threshold reduction score can be set based on predetermined increments and whether a previous iteration of method 300 resulted in a detected expected behavior. The computing device can initially set the threshold reduction score at a setting within a range [THmin, THmax], wherein THmin refers to the lowest given score, and THmax refers to the highest given score. In some examples, the initial value of the threshold reduction score can be defined by some parameter. For example, the initial setting of the threshold reduction score can be 0.75 of the range of [THmin, THmax]. In some examples, the computing device can lower the threshold reduction score if the previous iteration resulted in an expected behavior. Lowering the threshold reduction score may thus result in the computing device removing additional elements from the model. In some examples, a previous iteration of method 300 may have finished without the computing device detecting an expected behavior. The computing device can raise the threshold reduction score in order to include more elements in the model. For example, the computing device can raise the threshold reduction score by half of the predetermined increment.

At block 310, the computing device generates a reduced model by reducing the model based on the relevance scores and the threshold reduction score. For example, the computing device can remove any elements having a score that exceeds the threshold reduction score.

At block 312, the computing device evaluates the reduced model based on the test case. For example, the computing device can test the reduced model using the test case that resulted in the expected behavior when used to test the original test model received at block 302 above.

At block 314, the computing device determines whether the reduced model reproduces an expected behavior. For example, the expected behavior can be a failure of the test case. If the computing device detects that the reduced model reproduces an expected behavior, then the method 300 may proceed at block 318. If the computing device detects that the reduced model does not reproduce the expected behavior, then the method 300 may proceed at block 316.

At block 316, the computing device rolls back the removed elements in response to detecting the reduced model does not reproduce the expected behavior. For example, the computing device can roll-back the reduced model to the model received at block 302. In some examples, the computing device can return a list of rolled-back elements to use for rollback refinement in block 304.

At block 318, the computing device outputs reduced result model in response to detecting the reduced model reproduces the expected behavior. For example, the result model can include all the elements of the reduced model that reproduced the expected behavior. In some examples, the method 300 can then be repeated with a lower threshold reduction score. For example, additional reduced models with fewer elements can be produced using method 300.

The process flow diagram of FIG. 3 is not intended to indicate that the operations of the method 300 are to be executed in any particular order, or that all of the operations of the method 300 are to be included in every case. For example, block 304 may not be executed if no rolled-back elements are received at block 302. Additionally, the method 300 can include any suitable number of additional operations.

Figure 4:
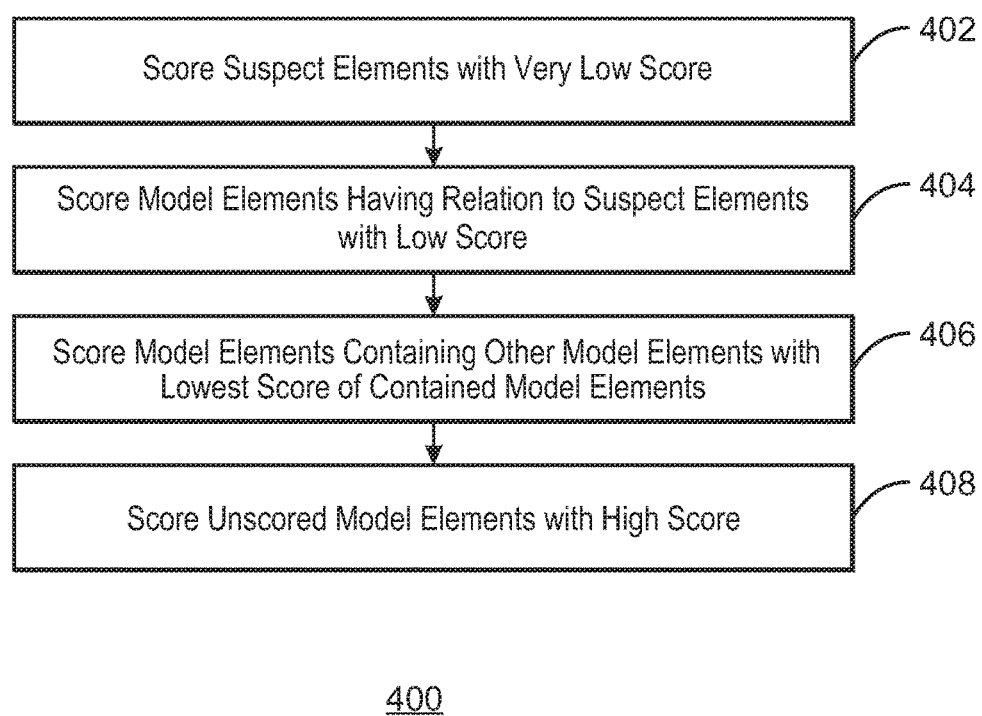
FIG. 4 is a process flow diagram of an example method for scoring model elements, in accordance with embodiments of the present invention.

FIG. 4 is a process flow diagram of an example method for scoring model elements, in accordance with embodiments of the present invention. The method 400 can be implemented with any suitable computing device, such as the computing device 800 of FIG. 8.

At block 402, the computing device scores suspect elements with a very low score. For example, the suspect elements can be one or more model elements in a received list of suspect elements that are suspected of causing the expected behavior or being somehow related to the expected behavior. Therefore, the computing device can score the suspect elements with a very low score to keep the suspect elements inside the reduced model. The very low score can be any value lower or equal to a predefined constant, such as Rsmall.

At block 404, the computing device scores model elements having a relation to suspect elements with a low score. The low score can be any value higher than a predefined constant, such as Rvlow, and lower or equal to a predefined constant, such as Rlow. For example, each model element that is connected with a relation, other than a container or contained relation, to a suspect element, can receive a low score. A container relation refers to a model element containing one or more other model elements. A contained relation refers to a model element being contained by another model element.

At block 406, the computing device scores model elements containing other model elements with a lowest score of contained model elements. For example, the computing device gives each model element that directly or indirectly contains another model element the lowest score of the contained model elements. For example, if one model element with a low score and one model element with a very low score depend on some model element that contains the low scoring elements, then the computing device can score the container element with a very low score. In some examples, when trying to set a new score to an element that already has a score, the computing device can set a new score if the new score is lower than a current score for each element. For example, if the container is scored very low and its contained model elements are scored low, then the container will remain scored very low.

At block 408, the computing device scores unscored elements with a high score. A high score can be any value greater than a predefined constant, such as Rmedium. For example, the computing device can detect that one or more elements are unrelated to suspect elements when traversing through a graph. The unrelated elements may still have a default score, such as a null score. The computing device can score the unscored elements with a high score to exclude the model elements from the reduced model because they are not connected to any suspect elements.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

Figure 5:
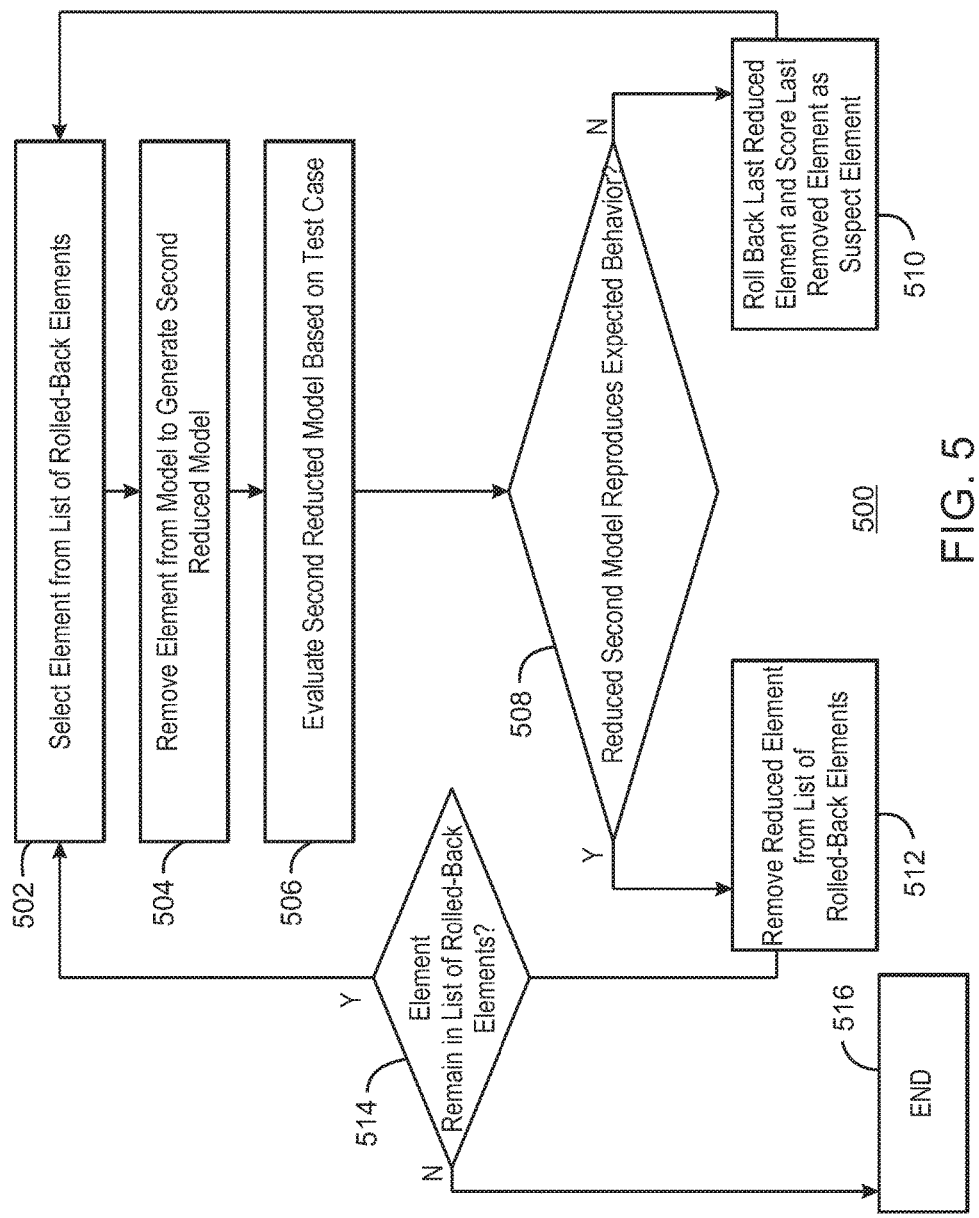
FIG. 5 is a process flow diagram of an example method for performing rollback refinement for a small number of rolled-back elements, in accordance with embodiments of the present invention.

FIG. 5 is a process flow diagram of an example method for performing rollback refinement for a small number of rolled-back elements, in accordance with embodiments of the present invention. As used herein, a small number of elements in the list of rolled-back elements refers to a number smaller than or equal to a predetermined constant, such as S small, which is also referred to as a small element number threshold. The method 500 can be implemented with any suitable computing device, such as the computing device 800 of FIG. 8.

At block 502, the computing device selects an element from a list of rolled-back elements. In some embodiments, the computing device can select any of the rolled-back elements. As discussed below, the method 500 can be repeated for each of the rolled-back elements. Thus, computing device can select a rolled-back element. The rolled-back element can be a potential suspect element.

At block 504, the computing device removes the element from the model to generate a second reduced model. For example, the second reduced model can exclude the rolled-back element.

At block 506, the computing device evaluates the second reduced model based on the test case. For example, the computing device can execute the test case on the second reduced model.

At block 508, the computing device determines whether the second reduced model reproduces the expected behavior. If the computing device detects that the second reduced model does not reproduce the expected behavior then the method 500 may proceed at block 510. If the computing device detects that the second reduced model reproduces the expected behavior, then the method 500 may proceed at block 512.

At block 510, the computing device rolls back the last removed element and scores the last removed element as a suspect element. For example, computing device can give the previously removed element a low score to prevent the element from being removed in future reduced models.

At block 512, the computing device removes the removed element from list of rolled-back elements. For example, the computing device can exclude the removed element from future reduced models, as the removed element did not prevent the expected behavior from being detected. The method 500 can then proceed at 502 with the remaining rolled-back elements in the list of rolled-back elements.

At block 514, the computing device determines whether any elements remain in the list of rolled-back elements. If the computing device detects remaining elements in the list of rolled-back elements, then the method 500 may proceed at block 502. If the computing device does not detect any remaining elements in the list of rolled-back elements, then the method 500 may proceed at block 516.

At block 516, the computing device stops performing the rollback refinement. For example, the computing device can proceed to blocks 204 or 306 of FIGS. 2 and 3 above.

The process flow diagram of FIG. 5 is not intended to indicate that the operations of the method 500 are to be executed in any particular order, or that all of the operations of the method 500 are to be included in every case. Additionally, the method 500 can include any suitable number of additional operations. For example, blocks 502-512 can be iteratively repeated until the list of rolled-back elements is empty.

Figure 6:
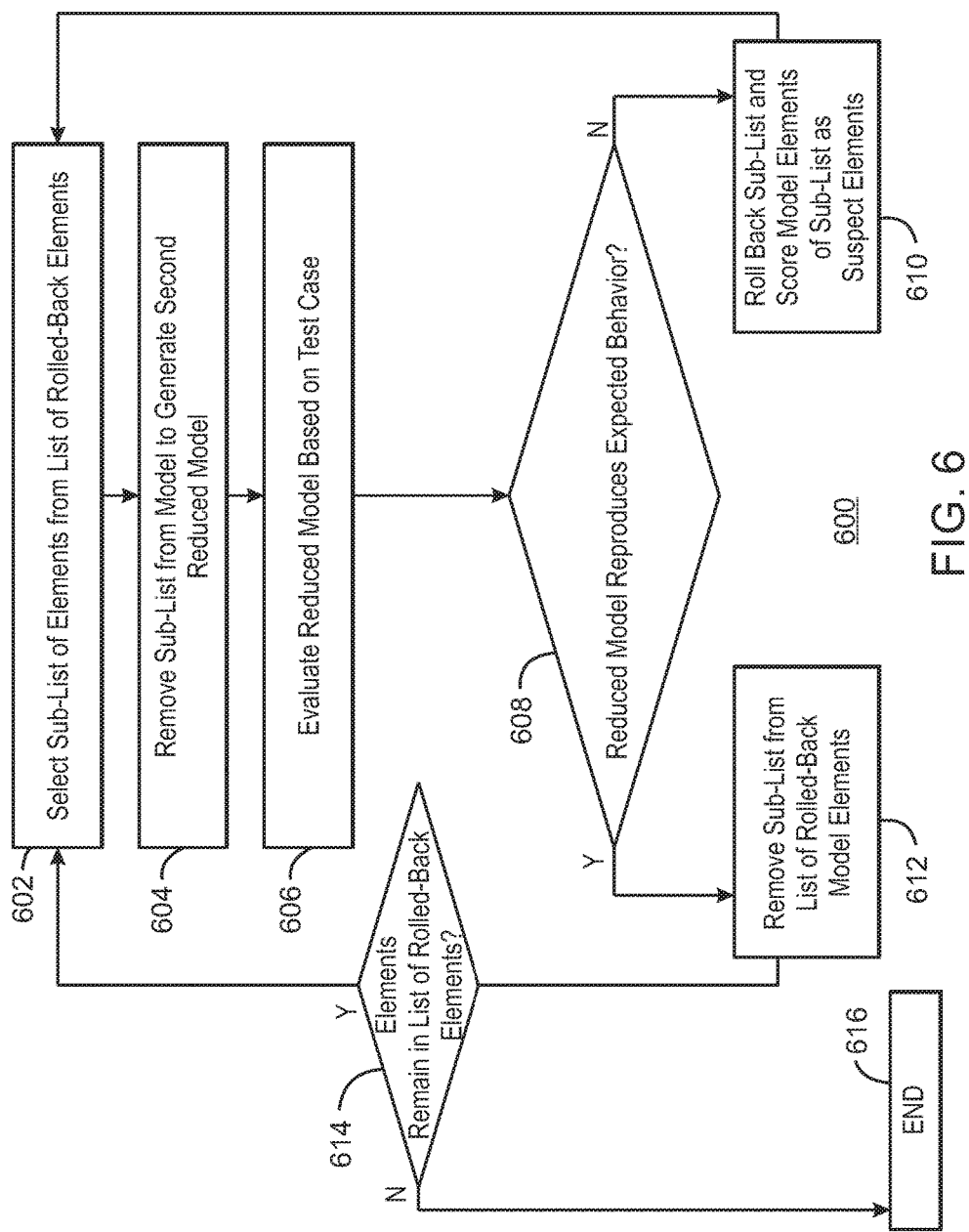
FIG. 6 is a process flow diagram of an example method for performing rollback refinement for a medium number of rolled-back elements, in accordance with embodiments of the present invention.

FIG. 6 is a process flow diagram of an example method for performing rollback refinement for a medium number of rolled-back elements, in accordance with embodiments of the present invention. As used herein, a medium number of elements in the list of rolled-back elements refers to a number greater than a first predetermined constant, such as Ssmall, but less than or equal to a second predetermined constant, such as Smedium, that is, the medium number is a number greater than or equal to the small element number threshold and less than a large element number threshold. The method 600 can be implemented with any suitable computing device, such as the computing device 800 of FIG. 8.

At block 602, the computing device selects a sub-list of elements from a list of rolled-back elements. In some examples, the computing device can select a sub-list of size k from the list of rolled-back elements, such that if there are $2^s$ sub-lists, wherein s is the number of elements in the list of rolled-back elements, then, $\binom{s}{k}$ of the sub-lists are of size k. For example, k can be 0.25*s, 0.5*s, etc.

At block 604, the computing device removes the sub-list from the model to generate a second reduced model. For example, the resulting second reduced model can exclude the sub-list of elements.

At block 606, the computing device evaluates the second reduced model based on the test case. For example, the computing device can execute the test case on the second reduced model.

At block 608, the computing device determines whether the second reduced model reproduces the expected behavior. If the computing device detects that the second reduced model does not reproduce the expected behavior, then the method 600 may proceed at block 610. If the computing device detects that the second reduced model does reproduce the expected behavior, then the method 600 may proceed at block 612.

At block 610, the computing device rolls back the sub-list in response to detecting that the second reduced model does not reproduce the expected behavior and scores the model elements of the sub-list as suspect elements. For example, computing device can give the elements of the sub-list a low score to prevent the elements from being reduced in future reduced models.

At block 612, the computing device removes the sub-list from the list of rolled-back model elements. For example, the computing device can remove the k elements of the sub-list, which were excluded from the second reduced model, from the list of rolled-back elements. The method 600 can then proceed at 602 with the remaining rolled-back elements in the list of rolled-back elements.

At block 614, the computing device determines whether any elements remain in the list of rolled-back elements. If there are elements remaining in the list of rolled-back elements, then the method 600 may proceed at 602 and the computing device can select an additional sub-list of elements. If there are no elements remaining in the list of rolled-back elements, then the method 600 may proceed at block 616.

At block 616, the computing device stops performing rollback refinement. In some examples, the computing device can then calculate scores as described in block 204 or block 306 above.

The process flow diagram of FIG. 6 is not intended to indicate that the operations of the method 600 are to be executed in any particular order, or that all of the operations of the method 600 are to be included in every case. Additionally, the method 600 can include any suitable number of additional operations. For example, blocks 602-612 can be iteratively repeated until the list of rolled-back elements is empty.

Figure 7:
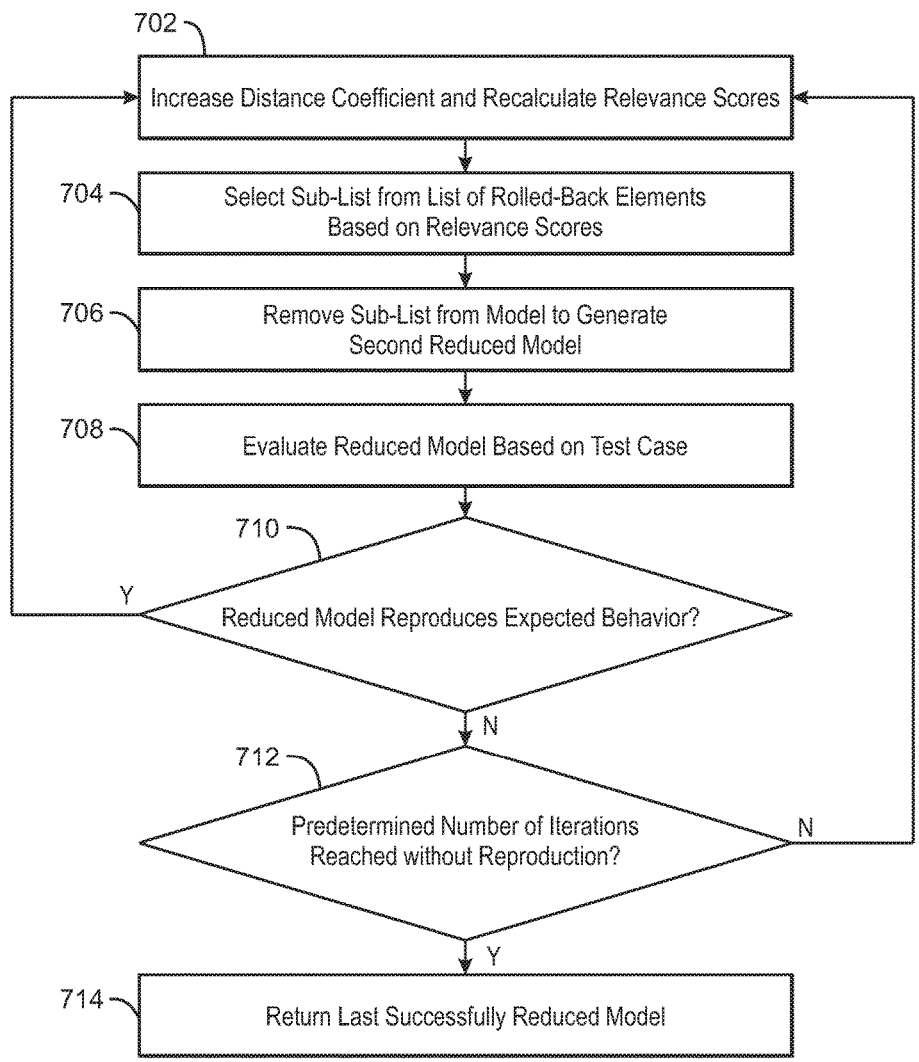
FIG. 7 is a process flow diagram of an example method for performing rollback refinement for a large number of rolled-back elements, in accordance with embodiments of the present invention.

FIG. 7 is a process flow diagram of an example method for performing rollback refinement for a large number of rolled-back elements, in accordance with embodiments of the present invention. A large number, as used herein, refers to a number of elements greater than a predetermined constant, such as Smedium, which is the large element number threshold. The method 700 can be implemented with any suitable computing device, such as the computing device 800 of FIG. 8.

At block 702, the computing device increases a distance coefficient to include additional model elements and recalculates relevance scores. In some examples, the computing device can increase the distance coefficient by a factor. For example, the computing device can increase the distance coefficient d using the equation d=d*2. The computing device can recalculate scores based on the increased distance coefficient.

At block 704, the computing device selects a sub-list of elements from a list of rolled-back elements based on relevance scores. In some examples, the computing device can select a sub-list of the list, corresponding to of a fraction of the list. For example, the fraction can be half, or 0.5*s elements from the list having higher relevance scores. In some examples, the computing device can set the threshold reduction score to the lowest score of the elements from the selected sub-list.

At block 706, the computing device removes the sub-list from the model to generate a second reduced model. For example, the second reduced model may exclude the sub-list of elements.

At block 708, the computing device evaluates the second reduced model based on the test case. For example, the computing device can execute the test case on the second reduced model.

At block 710, the computing device determines whether the second reduced model reproduces the expected behavior. If the computing device detects that the second reduced model reproduces the expected behavior, then the computing device can remove the sub-list from the list of rolled-back elements and the method 700 may proceed at block 702. For example, the computing device can increase the distance coefficient and recalculate the relevance scores. If the computing device detects that the second reduced model does not reproduce the expected behavior, then the method 700 may proceed at block 712.

At block 712, the computing device determines whether a predetermined number of iterations has been reached without reproduction of the expected behavior. For example, the predetermined number of iterations may be three iterations or any other suitable number of iterations. If the computing device detects that a predetermined number of iterations has been reached without reproduction of the expected behavior, then the method 700 may proceed at block 714. If the computing device detects that a predetermined number of iterations has not been reached without reproduction of the expected behavior, then the method 700 may proceed back to block 702.

At block 714, the computing device returns a last successfully reduced model. For example, the last successfully reduced model can be the last reduced model that produced the expected behavior in response to being evaluated using the test case. The reduced model that is returned can be used for testing an application or any suitable hardware component. For example, the reduced model, when executed by the application or hardware component being tested, can reproduce the expected behavior or error.

The process flow diagram of FIG. 7 is not intended to indicate that the operations of the method 700 are to be executed in any particular order, or that all of the operations of the method 700 are to be included in every case. Additionally, the method 700 can include any suitable number of additional operations.

Figure 8:
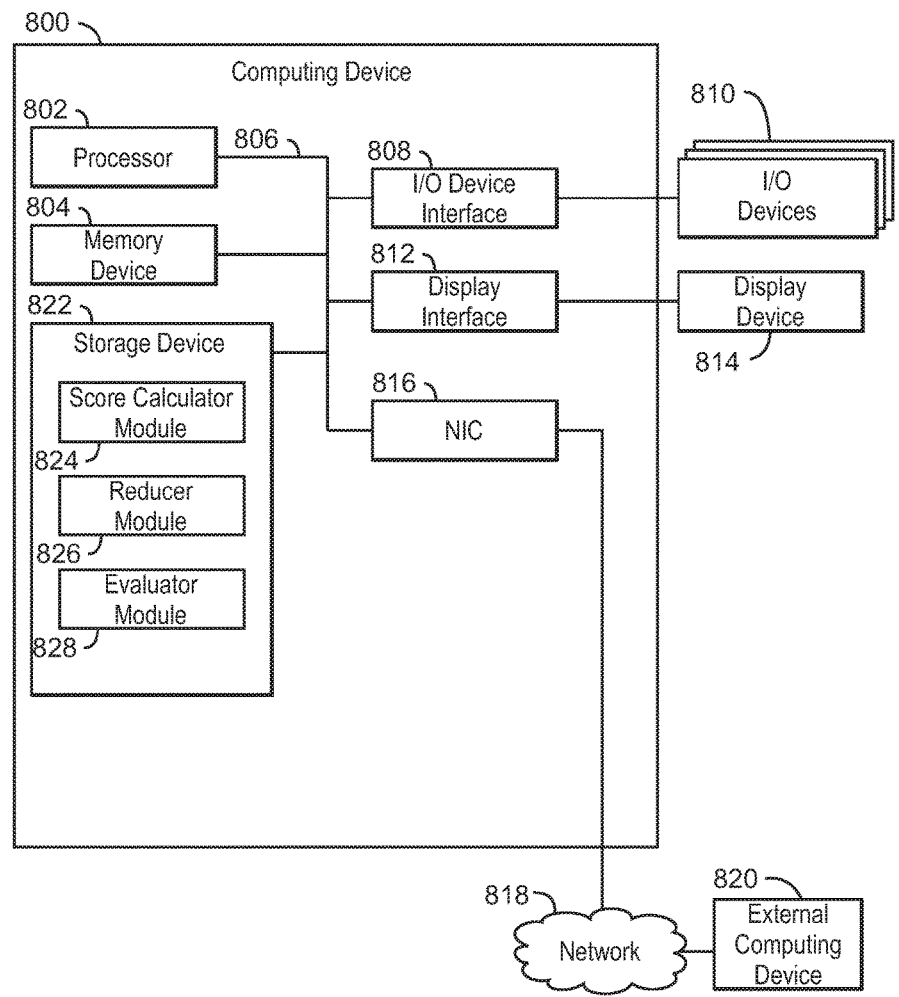
FIG. 8 is a block diagram of an example computing device that can reduce test models using relevance scores, in accordance with embodiments of the present invention.

FIG. 8 is a block diagram of an example computing device that can reduce test models using relevance scores, in accordance with embodiments of the present invention. The computing device 800 may be for example, a server, desktop computer, laptop computer, tablet computer, or smartphone. In some examples, computing device 800 may be a cloud computing node, such as one of cloud computing nodes 902 of FIG. 9. Computing device 800 may be described in the general context of computer system executable instructions, such as program modules, being executed by a computer system. Generally, program modules may include routines, programs, objects, components, logic, data structures, and so on that perform particular tasks or implement particular abstract data types. Computing device 800 may be practiced in distributed cloud computing environments where tasks are performed by remote processing devices that are linked through a communications network. In a distributed cloud computing environment, program modules may be located in both local and remote computer system storage media including memory storage devices.

The computing device 800 may include a processor 802 that is to execute stored instructions, a memory device 804 to provide temporary memory space for operations of the instructions during operation. The processor can be a single-core processor, multi-core processor, computing cluster, or any number of other configurations. The memory device 804 can include random access memory (RAM), read only memory, flash memory, or any other suitable memory systems.

The processor 802 may be connected through a system interconnect 806 (e.g., PCI®, PCI-Express®, etc.) to an input/output (I/O) device interface 808 configured to connect the computing device 800 to one or more I/O devices 810. The I/O devices 810 may include, for example, a keyboard and a pointing device, wherein the pointing device may include a touchpad or a touchscreen, among others. The I/O devices 810 may be built-in components of the computing device 800, or may be devices that are externally connected to the computing device 800.

The processor 802 may also be linked through the system interconnect 806 to a display interface 812 configured to connect the computing device 800 to a display device 814. The display device 814 may include a display screen that is a built-in component of the computing device 800. The display device 814 may also include a computer monitor, television, or projector, among others, that is externally connected to the computing device 800. In addition, a network interface controller (NIC) 816 may be configured to connect the computing device 800 through the system interconnect 806 to the network 818. In some embodiments, the NIC 816 can transmit data using any suitable interface or protocol, such as the Internet small computer system interface, among others. The network 818 may be a cellular network, a radio network, a wide area network (WAN), a local area network (LAN), or the Internet, among others. An external computing device 820 may connect to the computing device 800 through the network 818. In some examples, external computing device 820 may be an external web server. In some examples, external computing device 820 may be a cloud computing node.

The processor 802 may also be linked through the system interconnect 806 to a storage device 822 that can include a hard drive, an optical drive, a USB flash drive, an array of drives, or any combinations thereof. In some examples, the storage device may include a score calculator module 824, a reducer module 826, and an evaluator module 828. The score calculator module 824 can receive a model, a test case, and a suspect element. For example, the suspect element can be a specific instance, a metatype name, a model constraint, or an Object Constraint Language (OCL) expression, among other possible suspect elements. The score calculator module 824 can calculate a relevance score for each model element of the model based on the suspect element. The score calculator module 824 can set a threshold reduction score. The reducer module 826 may then generate a reduced model by reducing the model based on the relevance scores and the threshold reduction score. The evaluator module 828 can evaluate the reduced model based on the test case. The evaluator module 828 can also determine whether the reduced model reproduces an expected behavior. For example, the expected behavior can be a test case failure. The evaluator module 828 can further output the reduced model in response to detecting the reduced model reproduces the expected behavior.

In some examples, the score calculator module 824 can score suspect elements with a very low score. The score calculator module 824 can also score elements having a relation to suspect elements with a low score. The score calculator module 824 can score elements containing other elements with a lowest score of contained elements. The score calculator module 824 can further assign a high score to any remaining unscored elements. In some embodiments, the high score can be any predetermined value above a predefined constant, such as Rmedium. For example, any model elements with a value of NULL can be scored with a high score. In some examples, the reducer module 826 can roll back model elements in response to detecting the reduced model does not reproduce the expected behavior. The score calculator module 824 can then perform a rollback refinement based on the number of elements rolled back. For example, if a small number of elements were rolled-back, then the reducer module 826 can select an element from a list of rolled-back elements. The reducer module 826 can reduce the element from the model to generate a second reduced model. The evaluator module 828 can evaluate the second reduced model based on the test case. The evaluator module 828 can also select additional elements and evaluate the resulting reduced models after reducing each element from the model until the second reduced model does not reproduce the expected behavior. The score calculator module 824 can then roll back the last removed element and score the last removed element as a suspect element.

In some examples, in response to detecting that the number of rolled-back elements is medium in number, the reducer module 826 can select a sub-list of elements from a list of rolled-back elements. The reducer module 826 can reduce the sub-list from the model to generate a second reduced model. The evaluator module 828 can then evaluate the second reduced model based on the test case. The evaluator module 828 can also detect that the second reduced model reproduces the expected behavior and remove the sub-list from the list of rolled-back elements. The evaluator module 828 can similarly select additional elements and evaluate the resulting reduced models after reducing each element from the model until the second reduced model does not reproduce the expected behavior. The score calculator module 824 can then roll back the last removed element and score the last removed element as a suspect element.

In some examples, in response to detecting that the number of rolled-back elements is large in number, the score calculator module 824 can increase a distance coefficient and recalculate the relevance scores. For example, the distance coefficient can be a value that represents the factor used in the calculation of a relevance score together with the graph weight. For example, the score calculator module 824 can calculate a score based on the shortest distance to a suspect element multiplied by a factor of 5. In this case, the factor 5 is a distance coefficient. Increasing the value of the distance coefficient may result in a larger range of scores, allowing the reduction threshold to select a smaller reduction group.

The reducer module 826 can select a sub-list of elements from a list of rolled-back elements based on the relevance scores. The reducer module 826 can then reduce the sub-list from the model to generate a second reduced model. The evaluator module 828 can then evaluate the second reduced model based on the test case. The evaluator module 828 can also further detect a predetermined number of iterations without reproduction of the expected behavior. The evaluator module 828 can then return a last successfully reduced model in response to detecting the predetermined number of iterations without reproduction of the expected behavior.

It is to be understood that the block diagram of FIG. 8 is not intended to indicate that the computing device 800 needs to include all of the components shown in FIG. 8. Rather, the computing device 800 can include fewer or additional components not illustrated in FIG. 8 (e.g., additional memory components, embedded controllers, modules, additional network interfaces, etc.). Furthermore, any of the functionalities of the score calculator 824, the reducer module 826, and the evaluator module 828 may be partially, or entirely, implemented in hardware and/or in the processor 802. For example, the functionality may be implemented with an application specific integrated circuit, logic implemented in an embedded controller, or in logic implemented in the processor 802, among others. In some embodiments, the functionalities of the score calculator module 824, reducer module 826, and evaluator module 828 can be implemented with logic, wherein the logic, as referred to herein, can include any suitable hardware (e.g., a processor, among others), software (e.g., an application, among others), firmware, or any suitable combination of hardware, software, and firmware.

Figure 9:
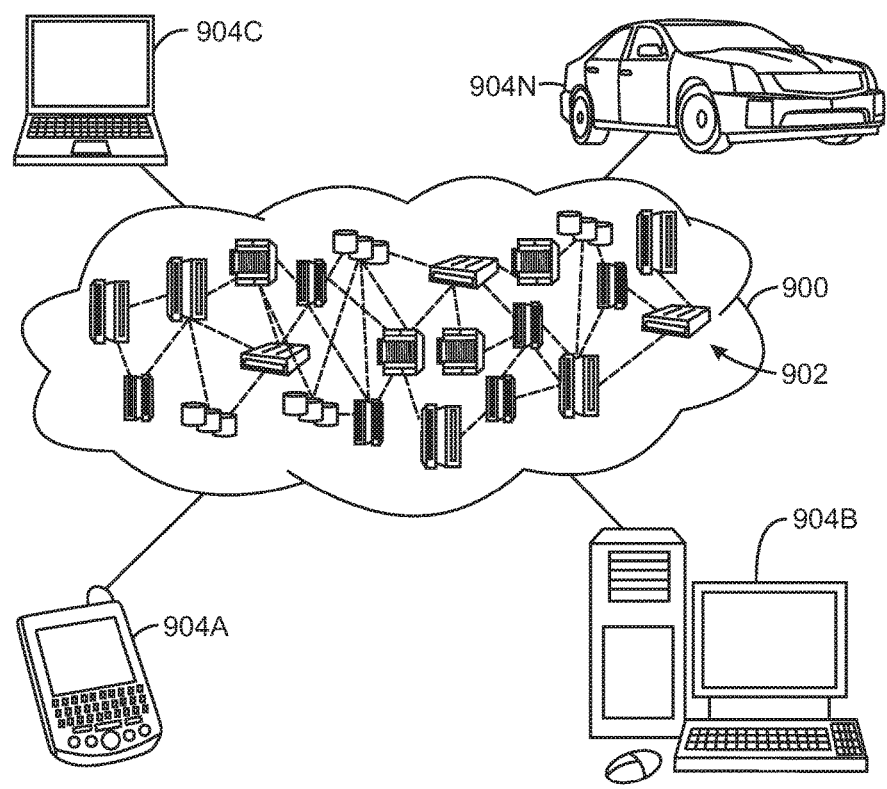
FIG. 9 depicts a cloud computing environment according to an embodiment of the present invention.

FIG. 9 depicts a cloud computing environment according to an embodiment of the present invention. As shown, cloud computing environment 900 comprises one or more cloud computing nodes 902 with which local computing devices used by cloud consumers, such as, for example, personal digital assistant (PDA) or cellular telephone 904A, desktop computer 904B, laptop computer 904C, and/or automobile computer system 904N may communicate. Nodes 902 may communicate with one another. They may be grouped (not shown) physically or virtually, in one or more networks, such as Private, Community, Public, or Hybrid clouds as described hereinabove, or a combination thereof. This allows cloud computing environment 900 to offer infrastructure, platforms and/or software as services for which a cloud consumer does not need to maintain resources on a local computing device. It is understood that the types of computing devices 904A-N shown in FIG. 9 are intended to be illustrative only and that computing nodes 902 and cloud computing environment 900 can communicate with any type of computerized device over any type of network and/or network addressable connection (e.g., using a web browser).

Figure 10:
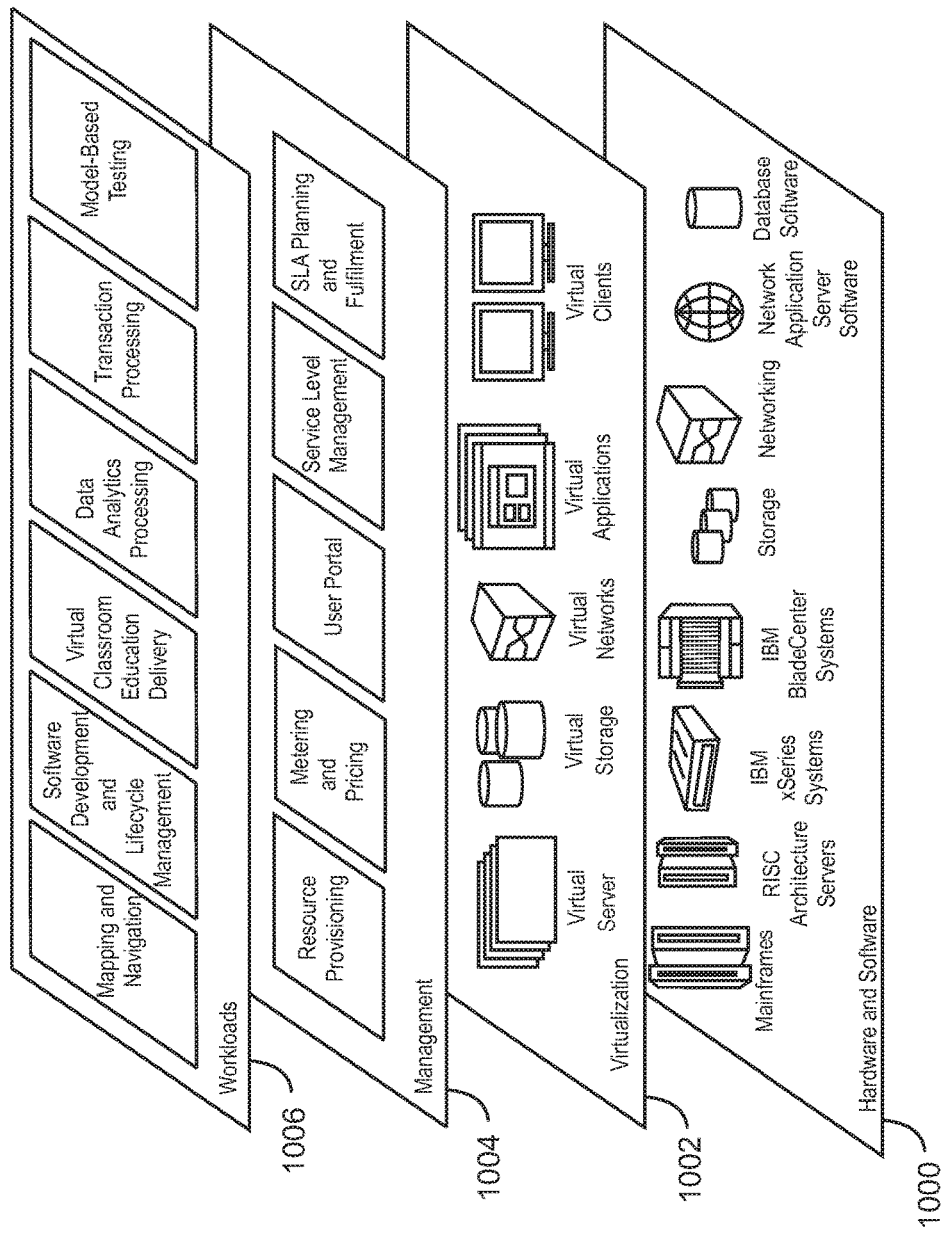
FIG. 10 depicts abstraction model layers according to an embodiment of the present invention.

FIG. 10 depicts abstraction model layers according to an embodiment of the present invention. The abstraction layers may be provided by cloud computing environment 900 (FIG. 9). It should be understood in advance that the components, layers, and functions shown in FIG. 10 are intended to be illustrative only and embodiments of the invention are not limited thereto. As depicted, the following layers and corresponding functions are provided:

Hardware and software layer 1000 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1002 provides an abstraction layer from which the following examples of virtual entities may be provided: virtual servers; virtual storage; virtual networks, including virtual private networks; virtual applications and operating systems; and virtual clients. In one example, management layer 1004 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1006 provides examples of functionality for which the cloud computing environment may be utilized. Examples of workloads and functions which may be provided from this layer include: mapping and navigation; software development and lifecycle management; virtual classroom education delivery; data analytics processing; transaction processing; and model-based testing, the functionality for which may be included in computing device 800 (FIG. 8).

The present invention may be a system, a method or computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 11:
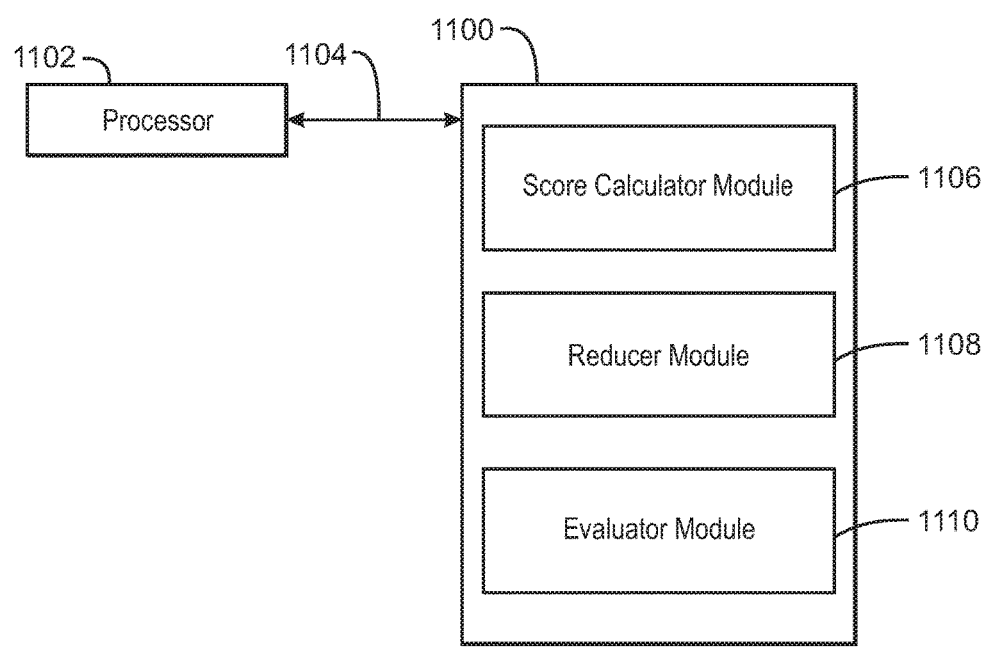
FIG. 11 is an example computer-readable storage medium storing program instructions to reduce test models using relevance scores, in accordance with embodiments of the present invention.

FIG. 11 is an example computer-readable storage medium 1100 storing program instructions to reduce test models using relevance scores, in accordance with embodiments of the present invention. The computer-readable storage medium 1100 may be accessed by a processor 1102 over a computer interconnect 1104. Furthermore, the computer-readable storage medium 1100 may include code to direct the processor 1102 to perform the operations of the methods 300-700 of FIGS. 3-7 above.

The various software components discussed herein may be stored on the computer-readable storage medium 1100, as indicated in FIG. 11. For example, a score calculator module 1106 includes code to receive a model, a test case, and a suspect element. The score calculator module 1106 also includes code to calculate a relevance score for each model element of the model based on the suspect element. In some examples, the score calculator module 1106 includes code to set a threshold reduction score. In some examples, the reducer module 1108 includes code to generate a reduced model by reducing the model based on the relevance scores and the threshold reduction score. An evaluator module 1110 includes code to evaluate the reduced model based on the test case. The evaluator module 1110 further includes code to determine whether the reduced model reproduces an expected behavior. For example, the expected behavior can be a test case failure. The evaluator module 1110 also includes code to output the reduced model in response to detecting the reduced model reproduces the expected behavior. In some examples, the score calculator module 1106 can include code to score suspects elements with a very low score. The score calculator module 1106 can also code to score elements having relation to suspect elements with a low score. The score calculator module 1106 can also include code to score elements containing other elements with a lowest score of contained elements. The score calculator module 1106 can also include code to score unscored elements with a high score.

In some examples, the score calculator module 1106 can include code to roll back model elements in response to detecting the reduced model does not reproduce the expected behavior. For example, the score calculator module 1106 can perform a rollback refinement based on the number of elements rolled back. In some examples, the number of rolled-back elements may be small. The reducer module 1108 can include code to select an element from a list of rolled-back elements. The reducer module 1108 can include code to reduce the element from the model to generate a second reduced model. The evaluator module 1110 can include code to evaluate the second reduced model based on the test case. The evaluator module can further have code to detect that the second reduced model reproduces the expected behavior and remove the element from the list of rolled-back elements. The evaluator module 1110 can also include code to select additional elements and evaluate the resulting reduced models after reducing each element from the model until the second reduced model does not reproduce the expected behavior. The score calculator module 1106 can include code to roll back the last removed element and score the last removed element as a suspect element. The evaluator module 1110 can also include code to modify an application associated with the model based on the reduced model.

In some examples, the score calculator module 1106 can include code to select a sub-list of elements from a list of rolled-back elements. For example, number of rolled-back elements may be may be medium. The reducer module 1108 can include code to reduce the sub-list from the model to generate a second reduced model. The evaluator module 1110 can include code to evaluate the second reduced model based on the test case. The evaluator module 1110 can also include code to detect that the second reduced model reproduces the expected behavior and remove the sub-list from the list of rolled-back elements. The reducer module 1108 can include code to select additional elements and evaluate the resulting reduced models after reducing each element from the model until the second reduced model does not reproduce the expected behavior. The score calculator module 1106 can include code to roll back the last removed element and score the last removed element as a suspect element.

In some examples, the score calculator module 1106 can include code to increase a distance coefficient and recalculate the relevance scores. For example, number of rolled-back elements may be large. The reducer module 1108 can include code to select a sub-list of elements from a list of rolled-back elements based on the relevance scores. The reducer module 1108 can further include code to reduce the sub-list from the model to generate a second reduced model. The evaluator module 1110 can include code to evaluate the second reduced model based on the test case. The evaluator module 1110 can include code to detect a predetermined number of iterations without reproduction of the expected behavior. The evaluator module 1110 can also further include code to return a last successfully reduced model. It is to be understood that any number of additional software components not shown in FIG. 11 may be included within the computer-readable storage medium 1100, depending on the particular application.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 11 may be included within the computer-readable storage medium 1100, depending on the specific application.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving, via a processor, a model having a set of model elements, a test case that produces an expected response when run on the model, and one or more suspect elements, the model corresponding to an application;
   calculating, via the processor, a relevance score for each model element of the set of model elements based on the one or more suspect elements;
   setting, via the processor, a threshold reduction score governing reduction of the model;
   generating, via the processor, a reduced model by reducing the set of model elements based on the relevance scores and the threshold reduction score;
   evaluating, via the processor, the reduced model based on the test case;
   determining, via the processor, that the reduced model does not reproduce an expected behavior when running the test case;
   rolling back a model element into the reduced model to produce a revised model;
   responsive to the revised model not reproducing the expected behavior, performing a rollback refinement of the revised model based on a number of model elements rolled back into the reduced model; and
   generating, via the processor, a modified application by modifying the application associated with the model based on the revised model.

2. The method of claim 1, wherein calculating the relevance score comprises:
   scoring, via the processor, the one or more suspect elements with a first predetermined score;
   scoring, via the processor, model elements having a relation to suspect elements with a second predetermined score higher than the first predetermined score;
   scoring, via the processor, model elements containing other model elements with a lowest score of the contained model elements; and
   scoring, via the processor, unscored model elements with a third predetermined score higher than the second predetermined score.

3. The method of claim 1, further comprising, in response to detecting a number of elements less than a small element number threshold were rolled back:
   selecting, via the processor, an element from a list of rolled-back elements;
   reducing, via the processor, the element from the model to generate a second reduced model;
   evaluating, via the processor, the second reduced model based on the test case;
   detecting, via the processor, that the second reduced model reproduces the expected behavior;
   removing the element from the list of rolled-back elements;
   selecting, via the processor, additional elements;
   evaluating the resulting reduced models after reducing each element from the model until the second reduced model does not reproduce the expected behavior;
   rolling back, via the processor, a last removed element; and
   scoring the last removed element as a suspect element.

4. The method of claim 1, further comprising, in response to detecting a number of elements greater than or equal to a small element number threshold and less than a large element number threshold were rolled back:
   selecting, via the processor, a sub-list of elements from a list of rolled-back elements;
   reducing, via the processor, the sub-list from the model to generate a second reduced model;
   evaluating, via the processor, the second reduced model based on the test case;
   detecting, via the processor, that the second reduced model reproduces the expected behavior and removing the sub-list from the list of rolled-back elements;
   selecting, via the processor, additional sub-lists and evaluating the resulting reduced models after reducing each sub-list from the model until the second reduced model does not reproduce the expected behavior; and
   rolling back, via the processor, an associated sub-list in response to detecting that the second reduced model does not reproduce the expected behavior and scoring the elements of the sub-list as suspect elements.

5. The method of claim 1, further comprising, in response to detecting a number of elements greater than a large element number threshold were rolled back:
   increasing, via the processor, a distance coefficient and recalculate the relevance scores;
   selecting, via the processor, a sub-list of elements from a list of rolled-back elements based on the relevance scores;
   reducing, via the processor, the sub-list from the model to generate a second reduced model;
   evaluating, via the processor, the second reduced model based on the test case;
   detecting, via the processor, a predetermined number of iterations without reproduction of the expected behavior; and
   returning, via the processor, a last successfully reduced model.

6. The method of claim 5, further comprising:
   returning a last successfully reduced model.

7. A computer program product comprising a computer-readable storage medium having a set of instructions stored therein which, when executed by a processor, cause the processor to:
   receive a model having a set of model elements, a test case that produces an expected result when run on the model, and one or more suspect elements;
   calculate a relevance score for each model element of the set of model elements based on the one or more suspect elements;
   set a threshold reduction score governing reduction of the model;

generate a reduced model by reducing the set of model elements based on the relevance scores and the threshold reduction score;
evaluate the reduced model based on the test case;
determine that the reduced model does not reproduce the expected behavior when running the test case;
roll back a model element into the reduced model to produce a revised model;
responsive to the revised model not reproducing the expected behavior, perform a rollback refinement of the revised model based on a number of model elements rolled back into the reduced model; and
modify an application associated with the model based on the revised model.

8. The computer program product of claim 7, wherein the set of instructions, when executed by the processor, further cause the processor to:
score the one or more suspect elements with a first predetermined score;
score model elements having a relation to suspect elements with a second predetermined score higher than the first predetermined score;
score model elements containing other model elements with a lowest score of the contained model elements; and
score unscored model elements with a third predetermined score higher than the second predetermined score.

9. The computer program product of claim 7, wherein the set of instructions, when executed by the processor, further cause the processor to:
select an element from a list of rolled-back elements;
remove the element from the model to generate a second reduced model;
evaluate the second reduced model based on the test case;
detect that the second reduced model reproduces the expected behavior;
remove the element from the list of rolled-back elements;
select additional elements;
evaluate the resulting reduced models after reducing each element from the model until the second reduced model does not reproduce the expected behavior;
roll back a last removed element; and
score the last removed element as a suspect element.

10. The computer program product of claim 7, wherein the set of instructions, when executed by the processor, further cause the processor to:
select a sub-list of elements from a list of rolled-back elements;
remove the sub-list from the model to generate a second reduced model;
evaluate the second reduced model based on the test case;
detect that the second reduced model reproduces the expected behavior and remove the sub-list from the list of rolled-back elements;
select additional sub-lists and evaluate the resulting reduced models after reducing each sub-list from the model until the second reduced model does not reproduce the expected behavior; and
roll back an associated sub-list in response to detecting that the second reduced model does not reproduce the expected behavior and score the elements of the sub-list as suspect elements.

11. The computer program product of claim 7, wherein the set of instructions, when executed by the processor, further cause the processor to:
increase a distance coefficient and recalculate the relevance scores;
select a sub-list of elements from a list of rolled-back elements based on the relevance scores;
remove the sub-list from the model to generate a second reduced model;
evaluate the second reduced model based on the test case;
detect a predetermined number of iterations without reproduction of the expected behavior; and
return a last successfully reduced model.

12. A computer system, comprising:
a processor set;
a computer readable storage medium; and
program instructions which, when executed by the processor set, cause the processor set to:
receive a model having a set of model elements, a test case that fails when run on the model, and one or more suspect elements;
calculate a relevance score for each element of a plurality of model elements of the set of model elements based on the one or more suspect elements;
set a threshold reduction score governing reduction of the model;
generate a reduced model by reducing the set of model elements based on the relevance scores and the threshold reduction score;
evaluate the reduced model based on the test case;
determine that the reduced model does not reproduce an expected behavior when running the test case;
roll back a model element into the reduced model to produce a revised model;
responsive to the revised model not reproducing the expected behavior, perform a rollback refinement of the revised model based on a number of model elements rolled back into the reduced model; and
modify an application associated with the model based on the revised model.

13. The computer system of claim 12, wherein the program instructions, when executed by the processor set, further cause the processor set to:
score the one or more suspect elements with a first predetermined score;
score model elements having relation to suspect elements with a second score higher than the first predetermined score;
score model elements containing other model elements with a lowest score of the contained model elements; and
score unscored model elements with a third score higher than the second score.

14. The computer system of claim 12, wherein the program instructions, when executed by the processor set, further cause the processor set to, in response to detecting a number of elements less than a small element number threshold are to be rolled back:
select an element from a list of rolled-back elements;
remove the element from the model to generate a second reduced model;
evaluate the second reduced model based on the test case;
detect that the second reduced model reproduces the expected behavior;
remove the element from the list of rolled-back elements;
select additional elements;
evaluate the resulting reduced models after reducing each element from the model until the second reduced model does not reproduce the expected behavior;
roll back a last removed element; and
score the last removed element as a suspect element.

15. The computer system of claim 12, wherein the program instructions, when executed by the processor set, further cause the processor set to, in response to detecting a number of elements greater than or equal to a small element number threshold and less than a large element number threshold:
- select a sub-list of elements from a list of rolled-back elements;
- reduce the sub-list from the model to generate a second reduced model;
- evaluate the second reduced model based on the test case;
- detect that the second reduced model reproduces the expected behavior and remove the sub-list from the list of rolled-back elements;
- select additional sub-lists and evaluate the resulting reduced models after reducing each sub-list from the model until the second reduced model does not reproduce the expected behavior; and
- roll back an associated sub-list in response to detecting that the second reduced model does not reproduce the expected behavior and score the elements of the sub-list as suspect elements.

16. The computer system of claim 12, wherein the program instructions, when executed by the processor set, further cause the processor set to, in response to detecting a number of elements greater than a large element number threshold were rolled back:
- increase a distance coefficient and recalculate the relevance scores;
- select a sub-list of elements from a list of rolled-back elements based on the relevance scores;
- reduce the sub-list from the model to generate a second reduced model;
- evaluate the second reduced model based on the test case;
- detect a predetermined number of iterations without reproduction of the expected behavior; and
- return a last successfully reduced model.

17. The computer system of claim 12, wherein the expected behavior comprises a test case failure.

18. The method of claim 1, further comprising:
generating a list of model elements removed from the model when the test case no longer fails.

19. The method of claim 1, wherein:
receiving the model is performed by a laptop computer; and
the model is received from the processor over a cloud computing environment.

20. The method of claim 1, wherein the expected behavior comprises a test case failure.

* * * * *